United States Patent
Dooley et al.

(10) Patent No.: US 9,440,237 B2
(45) Date of Patent: Sep. 13, 2016

(54) CORN STOVER BIOMASS FEEDSTOCKS WITH UNIFORM PARTICLE SIZE DISTRIBUTION PROFILES AT RETAINED FIELD MOISTURE CONTENTS

(71) Applicant: Forest Concepts, LLC, Auburn, WA (US)

(72) Inventors: James H. Dooley, Federal Way, WA (US); David N. Lanning, Federal Way, WA (US)

(73) Assignee: Forest Concepts, LLC, Auburn, WA (US)

( * ) Notice: Subject to any disclaimer, the term of this patent is extended or adjusted under 35 U.S.C. 154(b) by 0 days.

(21) Appl. No.: 14/676,133

(22) Filed: Apr. 1, 2015

(65) Prior Publication Data

US 2015/0266029 A1   Sep. 24, 2015

Related U.S. Application Data

(63) Continuation-in-part of application No. 14/312,312, filed on Jun. 23, 2014, now Pat. No. 9,005,758, which is a continuation-in-part of application No. 13/726,442, filed on Dec. 24, 2012, now Pat. No. 8,871,346, which is a continuation-in-part of application No. 13/594,312, filed on Aug. 24, 2012, now Pat. No. 8,481,160, which is a continuation-in-part of application No. PCT/US2011/033584, filed on Apr. 22, 2011, which is a continuation-in-part of application No. 12/966,198, filed on Dec. 13, 2010, now Pat. No. 8,839,106, which is a continuation of application No. 12/907,526, filed on Oct. 19, 2010, now Pat. No. 8,034,449.

(60) Provisional application No. 61/840,275, filed on Jun. 27, 2013, provisional application No. 61/343,005, filed on Apr. 22, 2010.

(51) Int. Cl.
| | | |
|---|---|---|
| *B02C 23/14* | (2006.01) | |
| *B02C 18/16* | (2006.01) | |
| *A01G 13/00* | (2006.01) | |
| *C10L 5/36* | (2006.01) | |
| *C10L 5/44* | (2006.01) | |
| *D21B 1/06* | (2006.01) | |

(52) U.S. Cl.
CPC .......... *B02C 23/14* (2013.01); *A01G 13/0262* (2013.01); *B02C 18/16* (2013.01); *C10L 5/363* (2013.01); *C10L 5/442* (2013.01); *C10L 5/445* (2013.01); *D21B 1/061* (2013.01); *Y02E 50/10* (2013.01); *Y02E 50/30* (2013.01)

(58) Field of Classification Search
CPC ....... B02C 23/14; B02C 18/16; Y02E 50/10; Y02E 50/30; A01G 13/0262; C10L 5/363; C10L 5/442; C10L 5/445; D21B 1/061

USPC .......................................................... 428/402
See application file for complete search history.

(56) References Cited

U.S. PATENT DOCUMENTS

| | | |
|---|---|---|
| 1,867 A | 11/1840 | Winans |
| 19,971 A | 4/1858 | Wheeler |
| 215,162 A | 5/1879 | Rice |
| 257,977 A | 5/1882 | Rice |
| 279,019 A | 6/1883 | Rice |
| 280,952 A | 7/1883 | Rice |
| 286,637 A | 10/1883 | Rice |
| 295,944 A | 4/1884 | Rice |
| 305,227 A | 9/1884 | Rice |
| 634,895 A | 10/1899 | Manning |
| 1,067,269 A | 7/1913 | Palmer |
| 1,090,914 A | 3/1914 | Guettler |
| 1,329,973 A | 2/1920 | Jardine |
| 1,477,502 A | 12/1923 | Killick |
| 1,980,193 A | 11/1934 | Finegan |
| 2,404,762 A | 7/1946 | Zajotti |
| 2,655,189 A | 10/1953 | Clark |
| 2,989,092 A | 9/1954 | Clark |
| 2,773,789 A | 12/1956 | Clark |
| 2,776,686 A | 1/1957 | Clark |
| 3,216,470 A | 11/1965 | Nilsson |
| 3,219,076 A | 11/1965 | Logan |
| 3,393,634 A | 7/1968 | Blackford |
| 3,396,069 A * | 8/1968 | Logan et al. ................. 428/155 |
| 3,415,297 A | 12/1968 | Yock |
| 3,773,267 A | 11/1973 | Schafer |
| 3,797,765 A | 3/1974 | Samuels |
| 3,913,643 A | 10/1975 | Lambert |
| 4,053,004 A | 10/1977 | Barwise |
| 4,346,745 A | 8/1982 | Weavell |

(Continued)

FOREIGN PATENT DOCUMENTS

| | | |
|---|---|---|
| DE | 1002007014293 | 10/2008 |
| EP | 1525965 | 4/2005 |

(Continued)

OTHER PUBLICATIONS

Erickson, J.R., Exploratory trials with spiral-head chipper to make "fingerling" chips for ring flakers, Forest Products Journal 26(6):50-53, Jun. 1976.
Sandlund, A.C.B., A study of wood adhesion and interactions using DMTA, Ph.D. Thesis, Lulea University of Technology, Sweden, Oct. 1984.
Janse, A.M.C., Modeling of flash pyrolysis of a single wood particle, Chemical Engineering and Processing 39:329-352, 2000.
Zeng, M., et al., Microscopic examination of changes of plant cell structure in corn stover due to cellulose activity and hot water treatment, Biotechnology and Bioprocessing 98(2):265-278, 2007.
Ileleji, K.E., et al., The angle of repose of bulk corn stover particles, Powder Technology 187(2):110-118, 2008.

(Continued)

*Primary Examiner* — Leszek Kiliman
(74) *Attorney, Agent, or Firm* — Thomas F. Broderick

(57) ABSTRACT

Corn-stover biomass feedstocks characterized by tight particle size distribution profiles at field moisture contents.

15 Claims, 8 Drawing Sheets

(56) References Cited

U.S. PATENT DOCUMENTS

| | | | |
|---|---|---|---|
| 4,364,423 A | 12/1982 | Schilling | |
| 4,421,149 A | 12/1983 | Barnes | |
| 4,558,725 A | 12/1985 | Veneziale | |
| 4,610,928 A | 9/1986 | Arasmith | |
| 4,681,146 A * | 7/1987 | Liska et al. | 144/369 |
| 4,953,795 A | 9/1990 | Bielagus | |
| 4,989,305 A | 2/1991 | Pole | |
| 5,029,625 A | 7/1991 | Diemer | |
| 5,048,763 A | 9/1991 | Szardi | |
| 5,087,400 A | 2/1992 | Theuveny | |
| 5,152,251 A | 10/1992 | Aukeman | |
| 5,199,476 A | 4/1993 | Hoden | |
| 5,215,135 A * | 6/1993 | Coakley et al. | 144/365 |
| 5,263,651 A | 11/1993 | Nadarajah | |
| 5,505,238 A | 4/1996 | Fujii | |
| 5,533,684 A | 7/1996 | Bielagus | |
| 5,842,507 A | 12/1998 | Fellman | |
| 5,927,627 A | 7/1999 | Edson | |
| 6,267,164 B1 | 7/2001 | Carpenter | |
| 6,280,842 B1 | 8/2001 | Nishibori | |
| 6,543,497 B2 | 4/2003 | Dietz | |
| 6,575,066 B2 | 6/2003 | Arasmith | |
| 6,729,068 B2 | 5/2004 | Dooley | |
| 6,811,879 B2 | 11/2004 | DeZutter | |
| 7,291,244 B2 | 11/2007 | DeZutter | |
| 7,998,580 B2 | 8/2011 | Brandenburg | |
| 8,034,449 B1 * | 10/2011 | Dooley et al. | 428/402 |
| 8,039,106 B1 * | 10/2011 | Dooley et al. | 428/402 |
| 8,481,160 B2 * | 7/2013 | Dooley et al. | 428/402 |
| 8,551,549 B2 | 10/2013 | Zeek | |
| 8,757,525 B2 | 6/2014 | Medoff | |
| 8,871,346 B2 * | 10/2014 | Dooley et al. | 428/402 |
| 9,005,758 B2 * | 4/2015 | Dooley et al. | 428/402 |
| 2002/0061400 A1 | 5/2002 | Rossler | |
| 2006/0219826 A1 | 10/2006 | Yamamoto | |
| 2007/0045456 A1 * | 3/2007 | Medoff | 428/402 |
| 2009/0145563 A1 | 6/2009 | Jarck | |
| 2010/0139156 A1 | 6/2010 | Mennell | |
| 2010/0307702 A1 | 12/2010 | Mann | |
| 2012/0052298 A1 | 3/2012 | Hagen | |
| 2014/0075832 A1 | 3/2014 | Mennell | |

FOREIGN PATENT DOCUMENTS

| | | |
|---|---|---|
| EP | 2045057 | 4/2009 |
| WO | 9717177 | 5/1997 |

OTHER PUBLICATIONS

Buckmaster, D.R., Assessing activity access of forage or biomass, Transactions of the ASABE 51(6):1879-1884, 2008.

Lanning, D., et al., Mode of failure for cutting solid section biomass, ASABE Paper No. 085111, Jun. 2008.

Kaliyan, N., et al., Commercial scale grinding of corn stover and perennial grasses, ASABE Paper No. 1009062, Jun. 2010.

Hongzhang, C., et al., The inhomogeneity of corn stover and its effects on bioconversion, Biomass and Bioenergy 35, pp. 1940-1945, 2011.

International Search Report and Written Opinion, dated Aug. 30, 2011, in International application No. PCT/US2011/033584.

Li, Z., et al., Cell morphology and chemical characteristics of corn stover fractions, Industrial Crops and Products 37, pp. 130-136, Jan. 2012.

Gil, M., et al., Handling behavior of two milled biomass: SRF poplar and corn stover, Fuel Processing Technology 112, pp. 76-85, 2013.

Liu, Z-H., et al., Effects of biomass particle size on steam explosion pretreatment performance for improving the enzyme digestibility of corn stover, Industrial Crops and Products 44, pp. 176-184, 2013.

* cited by examiner

↑ 4.8 mm

↑ 4.8 mm

US 9,440,237 B2

CORN STOVER BIOMASS FEEDSTOCKS WITH UNIFORM PARTICLE SIZE DISTRIBUTION PROFILES AT RETAINED FIELD MOISTURE CONTENTS

STATEMENT OF GOVERNMENT LICENSE RIGHTS

This invention was made with government support by the Small Business Innovation Research program of the U.S. Department of Energy, Contract SC0002291. The government has certain rights in the invention.

FIELD OF THE INVENTION

Our invention provides a rotary bypass shear comminution process to produce precision feedstock particles from corn stover.

BACKGROUND OF THE INVENTION

For many biomass conversion processes, it is preferable to maximize diffusion and heat-transfer distances both across and along the grain. It is also preferable to cut across the fiber bundles rather than preserve their natural length. In addition, many biofuel processes require small feedstock particle sizes. Re-comminution of biomass feedstocks has introduced processing concerns. Milling and grinding affects biomass particle shape as well as size. For example, the hammer mill process tends to break wood chips multiple times along the grain, initially into narrow sticks (aka, pin chips) and eventually into narrower fiber bundles that tend to retain the full chip length. Likewise, grinding, wet milling, and crushing tend to separate biomass fibers without cutting across the grain. Such comminution machines often require dry biomass, at 15% wet basis (wb) or less, yet drying plant biomass below its fiber saturation point, approximately 40-45% wwb (~30% dry basis), is an energy intensive process that may increase feedstock recalcitrance during conversion processing.

Thus, it would be advantageous to provide comminuted biomass particles with properties more favorable to biomass conversion processing.

SUMMARY OF THE INVENTION

Herein we describe a comminution process to produce a new class of corn stover feedstock particles characterized by consistent piece size and shape uniformity, high skeletal surface area to volume ratio, and good flow properties. Such precision feedstock particles are conveniently manufactured from corn stover materials at relatively low cost using the disclosed low-energy comminution processes. FIG. 7 shows a representative corn stover prior-art starting material (A), as compared to one-pass (B) and two-pass particles (C) produced therefrom as described in Example 2.

The invention provides a process of comminution of corn stover having a grain direction to produce a mixture of corn stover particles (P), wherein the comminution process comprises the step of feeding the corn stover in a direction of travel substantially randomly to the grain direction one or more times through a counter rotating pair of intermeshing arrays of cutting discs (D) arrayed axially perpendicular to the direction of corn stover travel. Preferably, the corn stover is further characterized by having a retained field moisture content of greater than 20% dry weight basis.

The cutting discs may have a uniform thickness ($T_D$), for example, $\frac{1}{32}$ inch $< T_D < \frac{3}{4}$ inch, or the cutting discs may have non-uniform thicknesses. Typically, the corn stover is fed through more than one counter rotating pairs of intermeshing arrays of cutting discs. In a first pass, the corn stover may be fed substantially parallel to the grain direction, with subsequent passes substantially random to the grain.

Thus, the corn stover may be fed sequentially through at least first and second counter rotating pairs of intermeshing arrays of cutting discs (D1 and D2). The first cutting discs D1 may have a uniform thickness ($T_{D1}$) and the second cutting discs D2 have a uniform thickness ($T_{D2}$), in which case $T_{D1}$ may be $> T_{D2}$. For example, $\frac{1}{8}$ inch $< T_{D1} < 1.5$ inch, and $\frac{1}{32}$ inch $< T_{D2} < \frac{3}{4}$ inch.

The resulting mixtures of corn stover particles are generally characterized by a substantially uniform size distribution profile as determined by the following protocol:

drying approximately 1000 g of the corn stover particles to constant weight at 110° F.;

pouring 400 g of the dried corn stover particles into a stacked screen assembly consisting of in a contiguous size-ordered array:

a top $\frac{3}{8}$-inch screen having 9.53 mm nominal sieve openings, a No. 4 screen having 4.75 mm nominal sieve openings, a No. 10 screen having 2.00 mm nominal sieve openings, a No. 16 screen having 1.18 mm nominal sieve openings, a No. 20 screen having 0.84 mm nominal sieve openings, a No. 35 screen having 0.50 mm nominal sieve openings, a No. 50 screen having 0.30 mm nominal sieve openings, a No. 100 screen having 0.15 mm nominal sieve openings, and a bottom pan; or a top 1-inch screen having 25.00 mm nominal sieve openings, a $\frac{1}{2}$-inch screen having 12.50 mm nominal sieve openings, a $\frac{3}{8}$-inch screen having 9.53 mm nominal sieve openings, a $\frac{1}{4}$-inch screen having 6.30 mm nominal sieve openings, a No. 4 screen having 4.75 mm nominal sieve openings, a No. 8 screen having 2.38 mm nominal sieve openings, a No. 16 screen having 1.18 mm nominal sieve openings, a No. 20 screen having 0.84 mm nominal sieve openings, and a bottom pan; or a top 3-inch screen having 75.00 mm nominal sieve openings, a 1.5-inch screen having 37.50 mm nominal sieve openings, a 1-inch screen having 25.00 mm nominal sieve openings, a $\frac{1}{2}$-inch screen having 12.50 mm nominal sieve openings, a $\frac{1}{4}$-inch screen having 6.30 mm nominal sieve openings, a $\frac{1}{8}$-inch screen having 3.18 mm nominal sieve openings, a No. 16 screen having 1.18 mm nominal sieve openings, and a bottom pan;

shaking the stacked screen assembly for 10 minutes on a motorized tapping sieve shaker;

weighing the corn stover particles that are retained on each of the screens; and determining that the corn stover mixture is characterized by a substantially uniform size distribution profile if the sum of the weights of corn stover particles retained on any contiguous five of the screens exceeds 320 g in total, and preferably exceeds 360 g in total.

Notably, the corn stover can be comminuted in a green, seasoned, or rehydrated condition, but to minimize feedstock recalcitrance in downstream fractionation processes the raw material should be comminuted at a retained field moisture content greater than its fiber saturation point.

DETAILED DESCRIPTION OF THE PREFERRED EMBODIMENT

Figure 1:
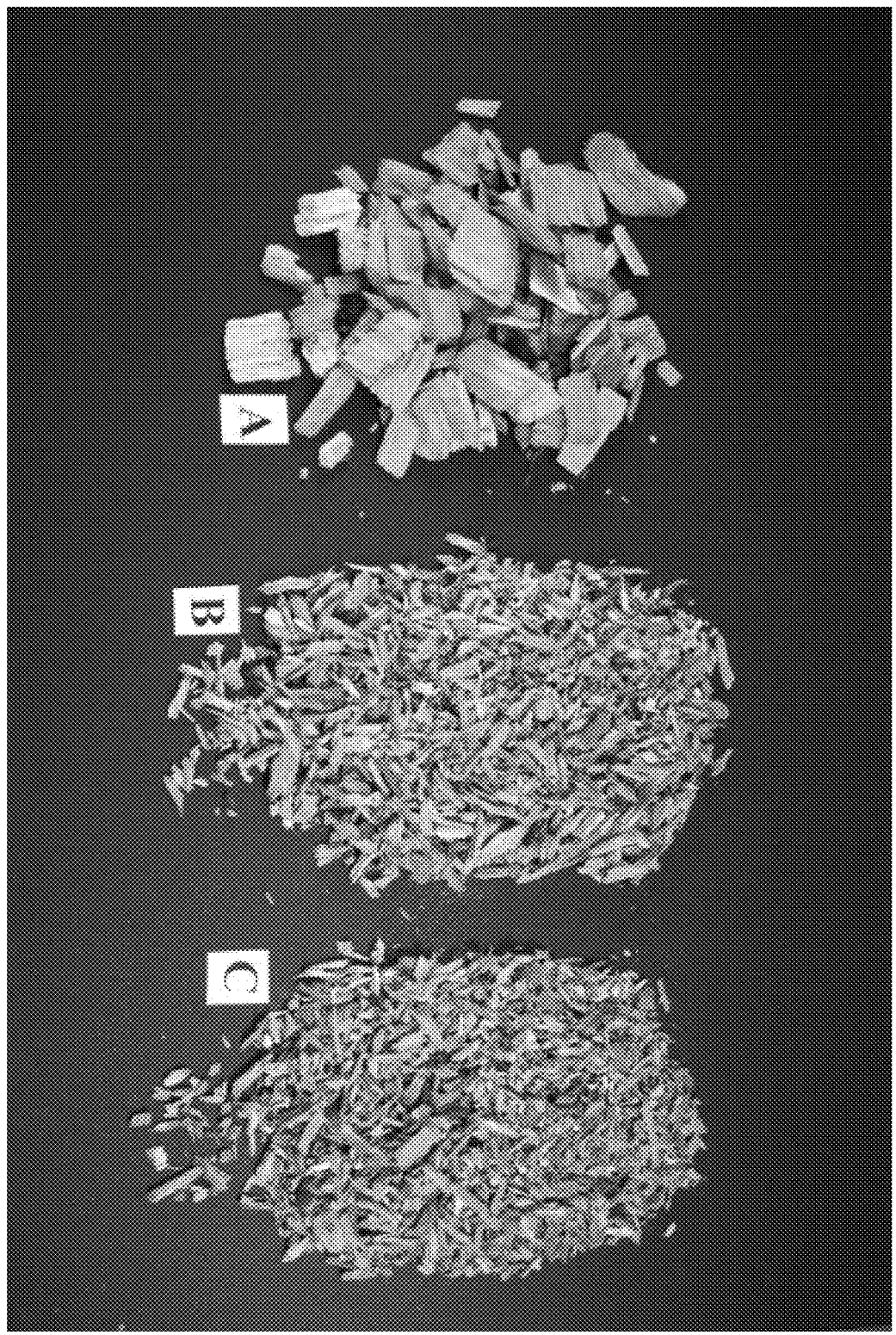
FIG. 1 is a photograph of 100-gram portions of three comminuted Douglas fir chip subsamples: A, wood chips (prior art); B, one-pass wood particles; and C, two-pass wood particles.

The term "corn stover" as used herein refers to the aboveground stalks, leaves, husks, tassels, and cobs that remain after corn grain is harvested.

The term "grain" as used herein refers generally to the arrangement and longitudinally arrayed direction of fibers within plant biomass materials. "Grain direction" is the orientation of the long axis of the dominant fibers in a piece of plant biomass material.

The terms "checks" or "checking" as used herein refer to lengthwise separation and opening between plant fibers in a biomass feedstock particle. "Surface checking" may occur on the lengthwise surfaces a particle (particularly on the L×W surfaces); and "end checking" occurs on the cross-grain ends (W×H) of a particle.

The term "extent" as used herein refers to an outermost edge on a particle's surface taken along any one of the herein described L, W, and H dimensions (that is, either parallel or normal to the grain direction, as appropriate); and "extent dimension" refers to the longest straight line spanning points normal to the two extent edges along that dimension. "Extent volume" refers to a parallelepiped figure that encompasses a particle's three extent dimensions.

The term "skeletal surface area" as used herein refers to the total surface area of a biomass feedstock particle, including the surface area within open pores formed by checking between plant fibers. In contrast, "envelope surface area" refers to the surface area of a virtual envelope encompassing the outer dimensions the particle, which for discussion purposes can be roughly approximated to encompass the particle's extent volume.

The term "field moisture content" refers to wood chips and hog fuel materials that retain a harvested moisture content above the approximately 30% (dry basis, db) fiber saturation point below which the physical and mechanical properties of wood begin to change as a function of moisture content. Such a wood material has not been dried below its fiber saturation point and then rehydrated, e.g., by soaking in water.

The adjectives "green" and "seasoned" indicate wood chips and hog fuel materials having moisture contents of more than or less than 19% db, respectively.

The term "disc" refers to a circular object having a uniform thickness (Td) between two opposing flat sides of equal diameter. Td is conveniently measured with an outside caliper. Cutting disc pairs can be assembled in uniform or non-uniform arrays of thicknesses.

The term "biogenic ash" refers to the inorganic constituents of plant cell walls and extracts within a biomass material and is an intrinsic property of a biomass feedstock material; "environmental ash" refers to extrinsic minerals entrained with and/or coated upon a biomass material resulting from soil contamination during harvest, collection, handling and storage; and "total ash content" refers to the sum of the biogenic ash content and the environmental ash content of a biomass material.

The new class of biomass particles described herein is readily optimized in size and shape for particular end-user processes and specifications.

We have found it very convenient to use wood chips as a raw material. Our preferred manufacturing method is to feed green wood chips one or more times into a rotary bypass shear with the grain direction oriented randomly to the feed direction through the machine's processing head.

Figure 2:
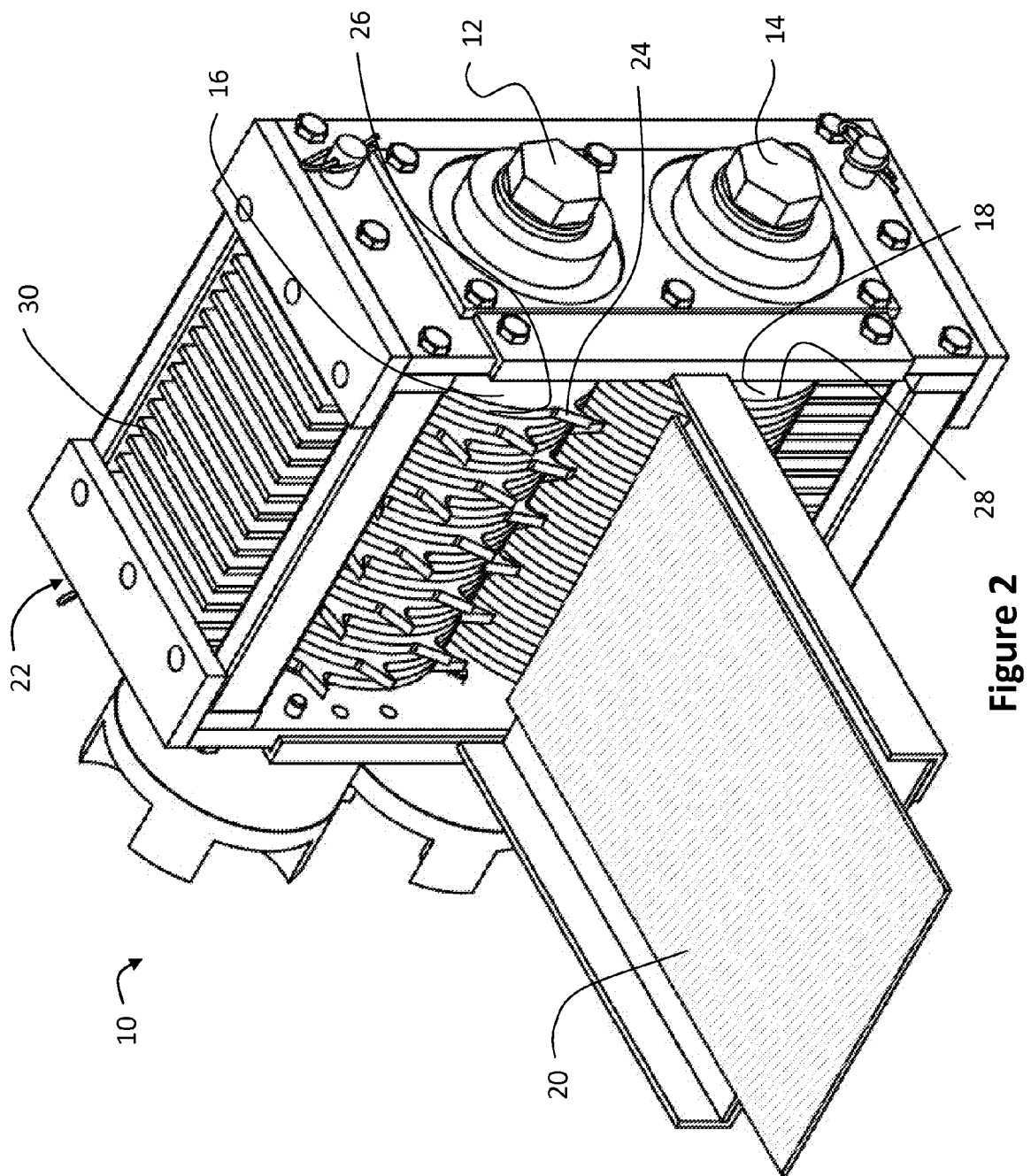
FIG. 2 is a perspective view of a prototype rotary bypass shear machine suitable to produce wood particles of the present invention.

The rotary bypass shear that we designed for manufacture of wood feedstock particles is a shown in FIG. 2. This prototype machine 10 is much like a paper shredder and includes parallel shafts 12, 14, each of which contains a plurality of cutting disks 16, 18. The disks 16, 18 on each shaft 12, 14 are separated by smaller diameter spacers (not shown) that are the same width or greater by 0.1 mm thick than the cutting disks 16, 18. The cutting disks 16, 18 may be smooth 18, knurled (not shown), and/or toothed 16 to improve the feeding of wood chips 20 through the processing head 22. Each upper cutting disk 16 in the depicted rotary bypass shear 10 contains five equally spaced teeth 24 that extend 6 mm above the cutting surface 26. The spacing of the two parallel shafts 12, 14 is slightly less than the diameter of the cutting disks 16, 18 to create a shearing interface. In our machine 10, the cutting disks 16, 18 are approximately 105 mm diameter and the shearing overlap is approximately 3 mm.

This rotary bypass shear machine 10 used for demonstration of the manufacturing process operates at an infeed speed of one meter per second (200 feet per minute). The feed rate has been demonstrated to produce similar particles at infeed speeds up to 2.5 meters per second (500 feet per minute).

The width of the cutting disks 16, 18 establishes one facet of the particles produced since the wood 20 (veneer is shown in this view) is sheared at each edge 28 of the cutters 16, 18. Thus, wood particles from our process are of more uniform size than are wood-chip particles from shredders, hammer mills and grinders that tend to split the chips grain wise. The desired length of the facets is set into the rotary bypass shear machine 10 by either installing cutters 16, 18 having widths equal to the desired output facet length or by stacking assorted thinner cutting disks 16, 18 to the appropriate cumulative cutter width.

Fixed clearing plates 30 ride on the rotating spacer disks to ensure that any particles that are trapped between the cutting disks 16, 18 are dislodged and ejected from the processing head 20.

We have found that frictional and Poisson forces that develop as the wood chip material 20 is sheared at a cutter edge 28 tend to create end checking that greatly increases the skeletal surface areas of the particles.

The subject comminution process and products are described in more detail below.

Example 1

Wood Chips

A Uniform Size Distribution Profile

Figure 3:
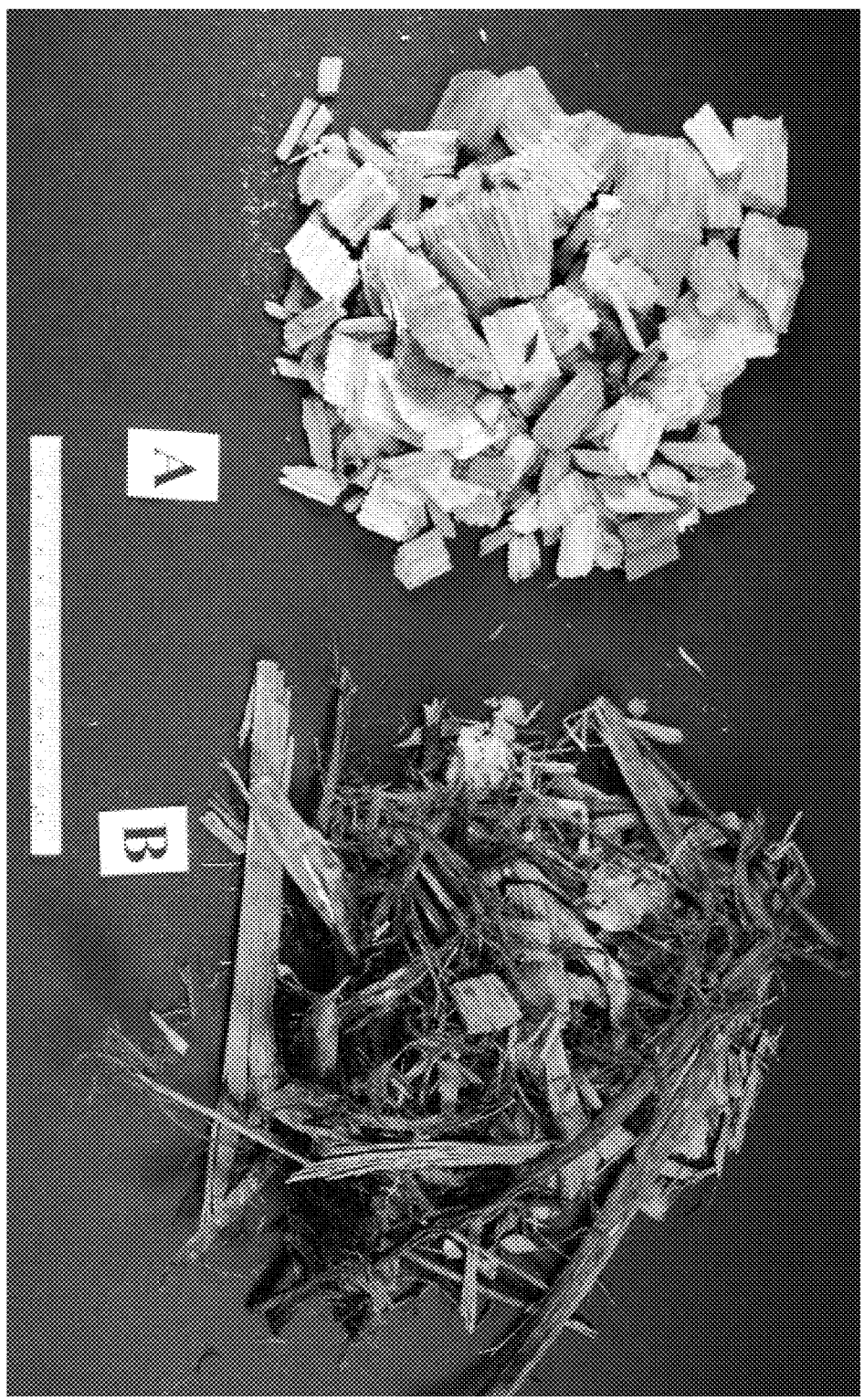
FIG. 3 (Prior Art) is a photograph of two industrial wood chip starting materials, (A) Douglas fir fuel grade chips and (B) whole-tree eucalyptus chips.

Two industrial wood chip raw materials, shown in FIG. 3, were comminuted by rotary bypass shear, and the particle size distributions of the resulting feedstocks were determined.

One starting material was fresh whole-tree Douglas fir fuel-grade chips that were destined for industrial power generation. As shown in FIG. 3A, these fuel chips were exceptionally clean, uniform, and mostly bark-free.

A sample of these fuel chips (53% wwb; as determined using the moisture content protocol described below) was subdivided into subsamples for processing through a Crumbler™ machine equipped with 3/16" (4.8 mm) cutters.

One subsample that was not processed ("no-pass") was reserved as a control. A second subsample was gravity fed in random orientations through the cutting head a single time ("one-pass"). A third subsample was passed through the cutting head twice ("two-pass"), that is, the raw chips were comminuted a first time, and then the comminuted material was sent through the cutting head in random orientations a second time.

Prior to size sorting, each of the three subsamples was dried to constant weight at 110° F. (43° C.). FIG. 1 is a photograph of 100-gram portions of these three dried softwood subsamples: A, no-pass; B, one-pass; and C, two-pass.

The dried subsamples were each size sorted on a Gilson® tapping sieve shaker, Sieve Screen Model No. SS-12R. Size distribution profiles were characterized by shaking ~500 or 1000 g of each subsample for 10 minutes in a stacked assembly of 3 inch, 1½ inch, ½ inch, ¼ inch, No. 8, No. 16, and Pan screens having the nominal sieve size openings noted in the "mm" column in the Table 1, which shows the resulting data (expressed as weight (g) and portion (%) of starting material retained on each screen).

TABLE 1

| Sieve | mm | No pass g | No pass % | 1 pass g | 1 pass % | 2 pass g | 2 pass % |
|---|---|---|---|---|---|---|---|
| 3 inch | 75.00 | 0 | 0 | 0 | 0 | 0 | 0 |
| 1½ inch | 37.50 | 10.45 | 2.3 | 0 | 0 | 0 | 0 |
| 1 inch | 25.00 | 85.28 | 18.6 | 0 | 0.7 | 0 | 0 |
| ½ inch | 12.50 | 246.01 | 53.6 | 6.19 | 33.4 | 1 | 0.1 |
| ¼ inch | 6.30 | 92.50 | 20.2 | 313.95 | 58.6 | 70.11 | 7.2 |
| No. 8 | 2.36 | 19.57 | 4.3 | 550.63 | 5.4 | 775.35 | 79.3 |
| No. 16 | 1.18 | 2.38 | 0.5 | 51.08 | 1.9 | 99.70 | 10.2 |
| Pan | 0 | 2.76 | 0.6 | 18.27 | 100 | 31.51 | 3.2 |
| Total | | 458.96 | 100 | 940.11 | 100 | 977.75 | 100 |
| Shown in FIGURE | | 1A | | 1B | | 1C | |

Figure 4:
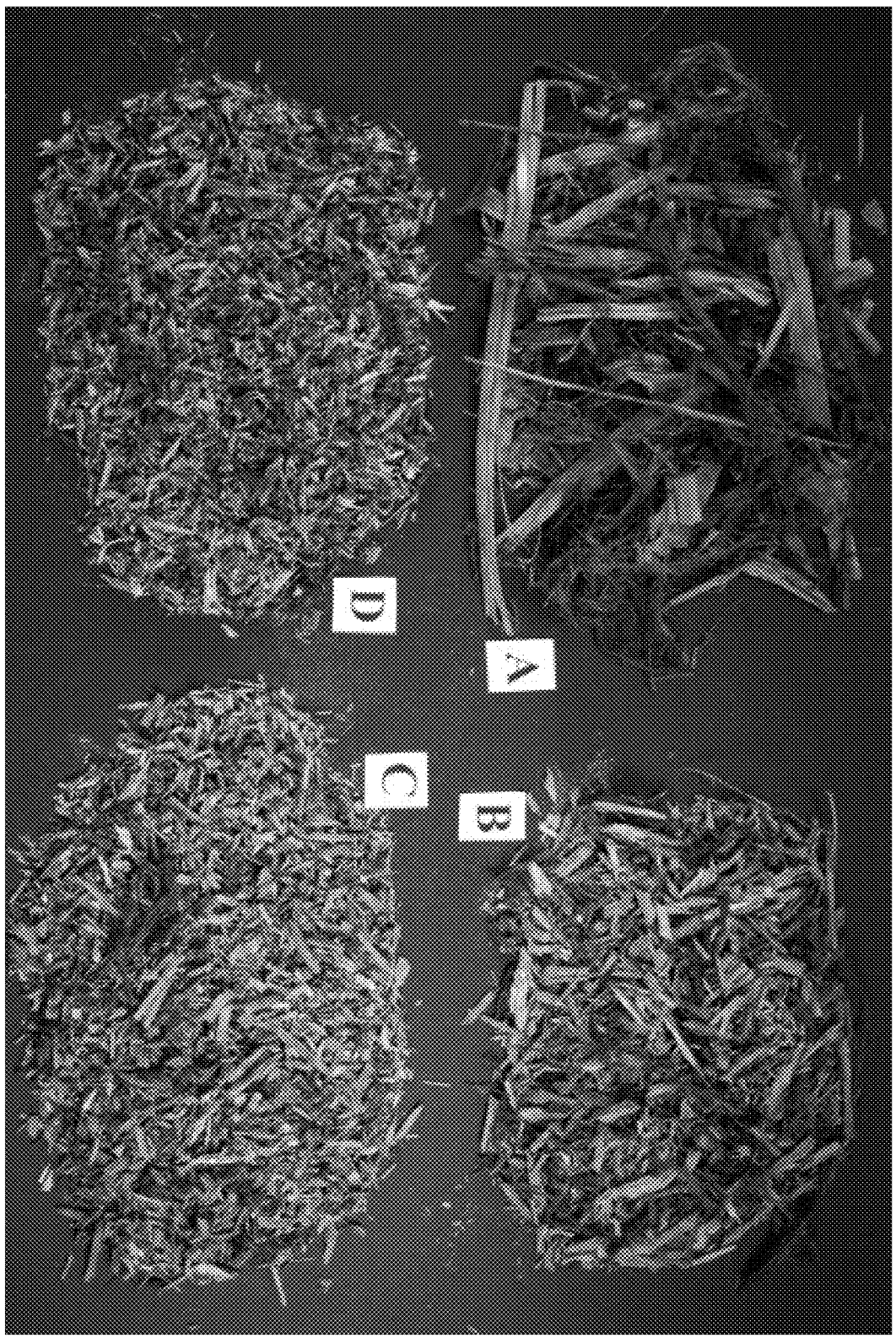
FIG. 4 is a photograph of 100-gram portions of four comminuted eucalyptus chip subsamples: A, wood chips (prior art); B, one-pass; C, two-pass; and D, three-pass.

The other starting material was fresh whole-tree eucalyptus chips destined for hammermilling into pellet furnish. As shown in FIG. 3B, the eucalyptus chips were relatively heterogeneous in size, shape, and anatomical content (with stringy bark and leaves). A sample of these eucalyptus chips (51% wwb) was subdivided and processed as described above, except that a fourth subsample was processed three times ("3 pass") through the cutting head. The subsamples were then dried as described above. FIG. 4 is a photograph of 100-gram portions of these four dried hardwood subsamples: A, no-pass; B, one-pass; C, two-pass; and D, three-pass.

Each of the subsamples was size sorted as described above, except that a wider array of screen sizes were used, as indicated in Table 2, which summarizes the particle size distributions of the four subsamples.

TABLE 2

| | | Grams retained on each screen (g) | | | |
|---|---|---|---|---|---|
| Sieve | mm | No pass | 1 pass | 2 pass | 3 pass |
| 1 inch | 25.00 | 36.2 | 2.2 | 4.5 | 0 |
| ½ inch | 12.50 | 79.4 | 8.9 | 12.2 | 0.6 |
| ⅜ inch | 9.53 | 59.3 | 8.8 | 9.3 | 1.7 |
| ¼ inch | 6.30 | 78.6 | 56.3 | 41.0 | 14.1 |
| No. 4 | 4.75 | 31.3 | 57.1 | 59.8 | 30.7 |
| No. 8 | 2.36 | 32.6 | 76.4 | 145.0 | 122.0 |
| No. 10 | 2.00 | 4.2 | 9.7 | 22.8 | 22.5 |
| No. 16 | 1.18 | 6.4 | 15.4 | 39.3 | 44.9 |
| No. 20 | 0.84 | 2.6 | 5.9 | 15.3 | 17.6 |
| Pan | 0 | 8.2 | 10.1 | 22.1 | 22.4 |
| Shown in FIGURE | | 4A | 4B | 4C | 4D |

Figure 5:
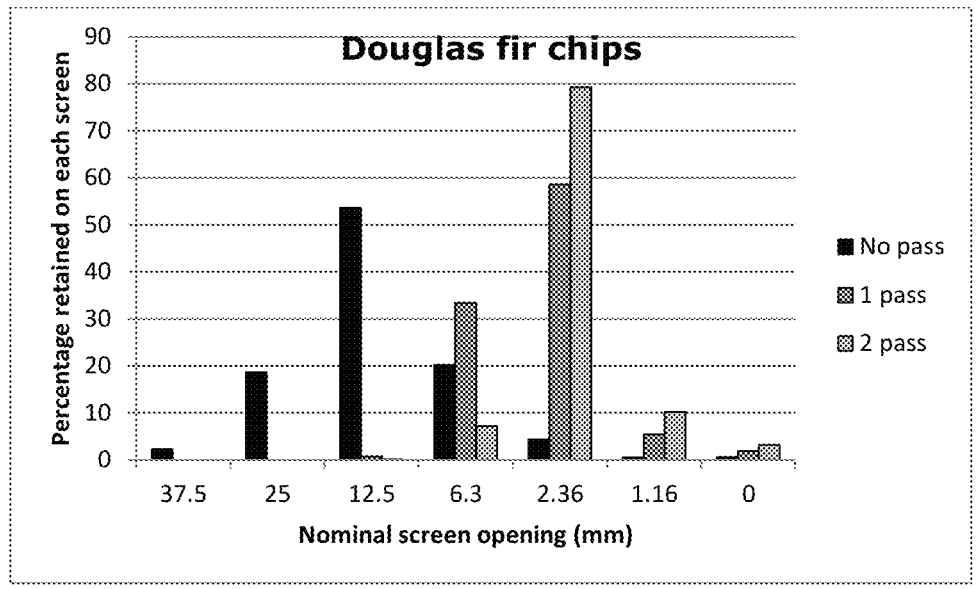
FIG. 5 shows particle size distribution data for the Douglas fir (A) and eucalyptus (B) subsamples shown in FIGS. 1 and 4.
Figure 5:
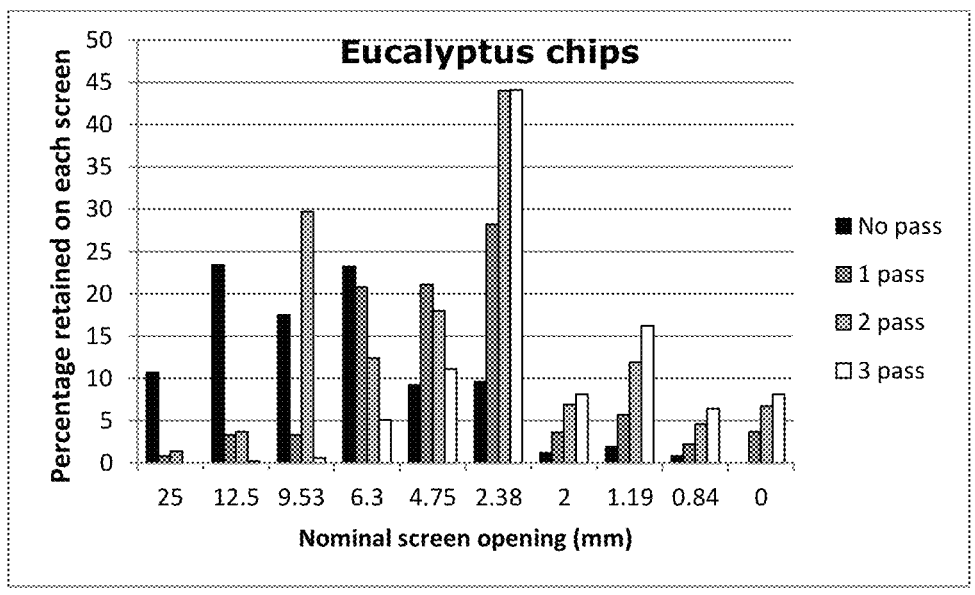

The data from Tables 1 and 2 are depicted on a percentage basis in FIGS. 5A and 5B, respectively.

Several observations are noteworthy. First, these comminution results were achieved with green wood chips (>50% wwb), in contrast to traditional hammer milling which requires that wood chips be first dried to less than ~15% wwb. Typically, the energy equivalent of more than 10% of the greenwood being milled will be consumed as fuel for the dryer burner. Second, the comminuted subsamples had tighter size distribution profiles than the raw wood chips. Furthermore, the size distribution profiles tended to tighten further with multiple passes. It is axiomatic that such feedstock size uniformity enables greater optimization of biofuel production processes.

Third, the size distribution profiles of the comminuted subsamples of both wood materials were similar, which indicates that this comminution process (wherein each piece is sheared only once, by a uniform distance) effected uniform comminution of both the clean softwood chips and the anatomically more heterogeneous, stringy hardwood chips.

Fourth, the tighter size distribution profiles of the cumminuted subsamples tended to cluster around the 4.8 mm width of the cutters (indicated by the arrows the FIGS. 5A and 5B). We have observed that such peaks in feedstock size uniformity can be selectively shifted up or down, as required for particular end users, by processing wood chips with larger or smaller cutter widths, respectively. Moreover, the number of passes through the cutting head can be selected to adjust and optimize the particle size distribution profile of the comminuted feedstock. Referring to FIG. 5B, for example, two passes achieved a nominal 4.8 mm no-pass target better than either one pass or three passes.

Thus, the invention provides precision wood particle mixtures characterized by a substantially uniform size distribution profile as determined by the following protocol: drying 1000 g of the wood particle mixture to constant weight at 110° F.; pouring approximately 300-400 g of the dried wood particles into a stacked screen assembly selected from among the Coarse, Medium, and Fine assemblies shown in Table 3 (below); shaking the stacked screen assembly for 10 minutes on a motorized tapping sieve shaker; weighing the wood particles that are retained on each of the screens; and determining that the wood particles are characterized by a substantially uniform size range if the sum of the weights of wood particles retained on any contiguous five of the screens exceeds 80% of the poured total. Preferably, the sum of the weights of wood particles retained on any contiguous three of the screens exceeds 90% of the poured total.

TABLE 3

| top ↓ | Coarse | | Medium | | Fine | |
|---|---|---|---|---|---|---|
| | Screen Size | Sieve (mm) | Screen Size | Sieve (mm) | Screen Size | Sieve (mm) |
| 1 | 3 inch | 75.00 | 1 inch | 25.00 | ⅜ inch | 9.53 |
| 2 | 1½ inch | 37.5 | ½ inch | 12.50 | No. 4 | 4.75 |
| 3 | 1 inch | 25.00 | ⅜ inch | 9.53 | ⅛ inch | 3.18 |
| 4 | ½ inch | 12.50 | ¼ inch | 6.30 | No. 10 | 2.00 |
| 5 | ¼ inch | 6.30 | No. 4 | 4.75 | No. 16 | 1.18 |
| 6 | ⅛ inch | 3.18 | No. 8 | 2.38 | No. 20 | 0.84 |
| 7 | No. 16 | 1.18 | No. 10 | 2.00 | No. 35 | 0.50 |
| 8 | Pan | 0.00 | No. 16 | 1.18 | No. 50 | 0.30 |
| 9 | | | No. 20 | 0.84 | No. 100 | 0.15 |
| 10 ↑ bottom | | | Pan | 0.00 | Pan | 0.00 |

A Shape Distribution Profile Favorable to Flowability

Biomass piece shape is an increasingly important quality parameter for comminuted biomass. Shape affects flowability and performance of materials handling systems, pretreatment, and rate of conversion. The following observations address flowability. Shape assessments were made of the three Douglas fir subsamples shown in FIG. 1. Some 100+ particles were randomly collected from each subsample, and extent particle dimensions were measured with a digital caliper: length (L) along the grain, width (W) normal to L and aligned cross grain, and thickness (T) normal to W and L. Particle weight was measured with an electronic balance.

Table 4 summarizes the particle dimensions (mm) and weight (g) data of the three subsamples. The calculated average (mean) values are indicated in underlined type, the standard deviations by italics, and the coefficients of variation (i.e., mean/SD) in bold type.

Several observations are noteworthy. First, rotary bypass shear of randomly oriented wood chips produces small and uniformly shaped particles. A chip is cut just one time during each pass-through the cutting head, at a predetermined distance set by the cutter width, and the tumultuous infeed orientation randomly positions the cut across the chip's L, W, and T dimensions. In contrast, milling and grinding tend to separate fibers without cutting across the grain.

Referring to Table 4, particle length (L) was reduced by half in the first pass and further reduced in the second pass. We have observed that particle length converges on the cutter width (4.8 mm in this example) as the number of passes increases following a power law function.

Particle width (W) rapidly converged to the cutter width. Here, width was reduced by half in the first pass and was further reduced to approximately the cutter width (4.8 mm) in the second pass.

Because the no-pass chip thickness (T) was initially less than the cutter width, this dimension was not as materially reduced as the L and W dimensions. Thus, the uniform minimum distance to center (thickness) of the wood chip raw material was substantially maintained.

The net effect is smaller, more uniformly shaped wood particle mixtures that can be readily optimized to meet particular end-user process specifications, by "tuning" the rotary bypass shear comminution of locally available chipped materials with empirically selected cutter width size(s) and pass-through number(s).

Biomass conversion systems require flowable feedstocks to continuously introduce biomass materials from ambient conditions into a controlled reactor environment. Here, the combination of size and shape uniformity with consistent reduction in particle length favors feedstock flowability. Flow is the relative movement of bulk particles in proximity to neighboring particles or along the wall of a container or storage tank. Steady and reliable flow of industrial feedstocks is desirable.

Particle size and shape affect the flowability of biomass feedstocks. Generally stated, the smaller the particle size, and the more spherical the particle shape, the better the flow; for example, small cubes flow better than sticks. For biomass particles, the dimensional length/width, length/thickness, and thickness/width ratios are useful indexes of the degree of tendency toward sphericity. Decreasing the L/W, L/T, and T/W ratios of a biomass raw material during comminution will tend to enhance flowability of the resulting feedstock. Consistency in particle shape and size is also important, as relatively long particles tend to bridge and interrupt flow, and so variations in particle length should be minimal.

The following Table 5 converts the dimensional data of Table 4 into such average ratios (underlined) with standard deviations (italics) and coefficients of variation (bold).

TABLE 4

| Douglas fir | n = | Length (L) | Width (W) | Thickness (T) | Wt. (g) | Shown in FIGURE |
|---|---|---|---|---|---|---|
| Raw Whole Tree Chips | 120 | 28.08 | 13.53 | 3.91 | 1.03 | 1A |
| | | 13.27 | 11.47 | 2.64 | | |
| | | 2.12 | 1.18 | 1.48 | | |
| Single Pass, 3/16" Cutters | 132 | 14.49 | 6.61 | 3.62 | 0.23 | 1B |
| | | 8.77 | 2.76 | 1.60 | | |
| | | 1.65 | 2.40 | 2.26 | | |
| Double Pass, 3/16" Cutters | 117 | 9.88 | 4.02 | 2.22 | 0.10 | 1C |
| | | 6.43 | 1.88 | 1.24 | | |
| | | 1.54 | 2.14 | 1.80 | | |

TABLE 5

| Douglas fir | n = | L/W | L/T | T/W | Shown in FIGURE |
|---|---|---|---|---|---|
| Raw Whole Tree Chips | 120 | 3.14 | 9.15 | 3.48 | 1A |
| | | 2.26 | 6.72 | 1.78 | |
| | | 1.40 | 1.36 | 1.96 | |
| Single Pass, 3/16" Cutters | 132 | 2.55 | 4.55 | 2.03 | 1B |
| | | 1.74 | 3.07 | 0.97 | |
| | | 1.47 | 1.48 | 2.09 | |
| Double Pass, 3/16" Cutters | 117 | 2.82 | 5.07 | 2.07 | 1C |
| | | 2.43 | 2.97 | 0.98 | |
| | | 1.16 | 1.71 | 2.11 | |

Several observations are noteworthy. First, the single-pass particles were smaller and mass (Table 4), and exhibited lower and tighter dimensional ratios (Table 5) than the raw wood chips. Hence, feedstock flowability would tend to increase.

Second, sending the single-pass material through the cutting head in random orientations a second time (Double Pass) significantly reduced particle size and mass (Table 4) while retaining the flow enhancing consistent roundness of the single-pass material as compared to the wood chip starting material (Table 5).

Third, length variation was reduced with each pass through the cutting head (Table 4), contributing to tighter L/W and L/T ratios (Table 5). Now, to generalize these observations, mindful that the subject feedstocks will often be "tuned" to fulfill particular end-user specifications, by comminuting available wood chip materials by one or more passes through particular cutter-width arrays. However, in many embodiments, the resulting wood particle feedstock will advantageously exhibit lower and tighter dimensional ratios than as observed for the already very uniform starting material in Table 5.

Thus, the subject wood particle mixtures—when made from wood chips wherein T<L, T<W, and L>W—are preferably characterized by a shape distribution profile conducive to flowability as determined by the following protocol: drying 1000 g of the wood particle mixture to constant weight at 110° F.; selecting at random 100 of the dried wood particles; measuring the length and width dimensions of each of the 100 wood particles; calculating a L/W value for each of the 100 wood particles; calculating a mean, a standard deviation, and a coefficient of variation from the 100 L/W values, and determining that the wood particles are characterized by a shape distribution profile conducive to flowability if the calculated mean is less than 3 with a coefficient of variance less than 2.

A Substantially Uniform Minimum Distance to Center, Favorable to Heat Transfer and Diffusion Pulp wood chips have been optimized to have a substantially uniform thickness in order to promote consistent diffusion and batch digestion in pulping liquor. Uniformity in thickness or minimum distance to center will also promote consistent heat transfer in pyrolysis processing. Referring back to Table 4, it was observed that the minimum distance to center (thickness) of a wood chip raw material can be substantially maintained by selecting a cutter width that is equal to of less than the average thickness of the raw chips. Starting. The resulting wood particle feedstocks will, in many embodiments, exhibit a lower and tighter minimum distance to center value than observed for the very uniform starting material in Table 4.

Thus, the subject wood particle mixtures are preferably characterized by a substantially uniform minimum distance to center as determined by the following protocol: drying approximately 1000 g of the wood particle mixture to constant weight at 110° F.; selecting at random 100 of the dried wood particles; measuring the length, width, and height dimensions of each of the selected wood particles; selecting the smallest of the three dimensional measurements for each particle; calculating from the 100 smallest dimensional measurements a mean, a standard deviation, and a coefficient of variation value; and determining that the wood particles are characterized by a substantially uniform minimum distance to center if the calculated coefficient of variation value is less than 3.0, and preferably less than 2.0.

A Disrupted Grain Structure Favorable to Heat Transfer and Diffusion

Figure 6:
FIG. 6 shows representative examples of the two cross-gain end surfaces that predominantly characterize the subject wood particles: A, a smoothly cut chip-like beveled surface, aligned normal to grain, with tight fiber ends; and B, a sheared surface, aligned oblique to grain, characterized by end checking.
Figure 6:
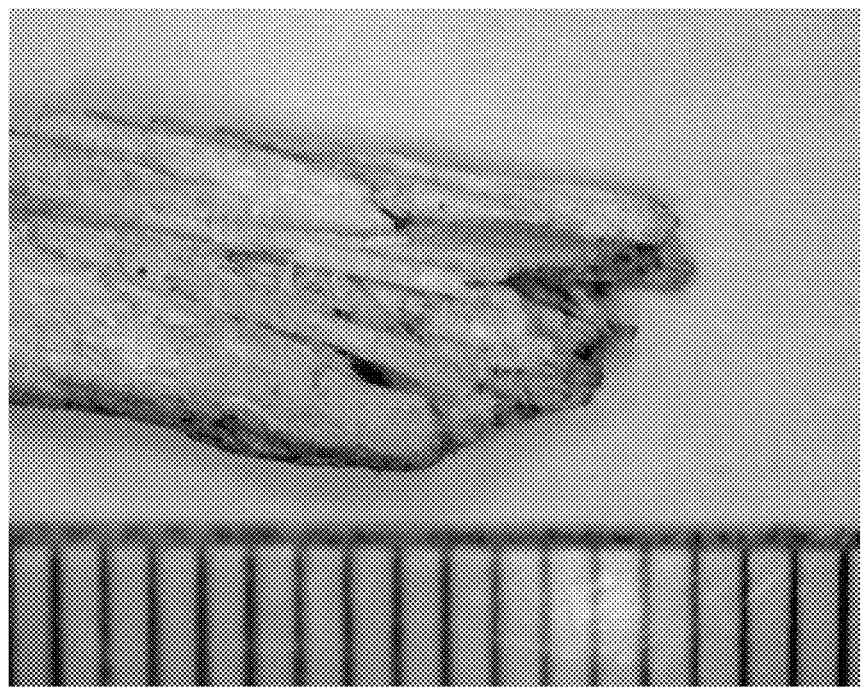

FIGS. 6A and 6B show representative examples of the two general types of lengthwise cross-gain end morphology that predominantly characterize the subject comminuted particle mixtures: A, a smoothly cut beveled surface with tight fiber ends; and B, a sheared surface characterized by disrupted fiber ends. (Scales are in millimeters.)

By way of illustration, a random handful of the fuel-chip one-pass subsample shown in FIG. 1B was gently shaken by hand on a No. 4 screen (4.76 mm) to remove smaller pieces (simply for convenient visual analysis). One hundred of the retained particles were observed using a magnifying glass for end structure morphology, using the above criteria to categorize each cross-grain end as either smoothly cut with tight fiber ends, or as having disrupted fiber ends. Results are shown in Table 6, wherein "2 Chip Ends" refers to parallelepiped-shaped particles (typically chips and pin chips) having a pair of oppositively beveled cross-grain ends cut tangential to the grain with tight fibers. "1 Chip & 1 Disrupted" refers to particles with one chip-like end ("Chip") and one cross sheared end (parallel or oblique to grain) with disrupted fiber ends ("Disrupted"). "2 Disrupted Ends" refers to particles having two cross-grain ends with disrupted fibers. We observed that the Disrupted Ends were often cut obliquely to the grain direction, resulting in a non-parallelepiped shaped particle.

TABLE 6

| | Particle End Grain Morphologies | | | | | |
|---|---|---|---|---|---|---|
| | 2 Chip Ends | 1 Chip & 1 Disrupted | 2 Disrupted Ends | Bark | Chunk | Total |
| Raw Whole Tree Chips | 92 | 0 | 2 | 5 | 1 | 100 |
| One Pass, 3/16" Cutters | 22 | 44 | 32 | 2 | 0 | 100 |

(In Table 6, "Bark" refers to bark particles, and "Chunk" refers to an oversized piece, which were not assessed in this observation.)

The Table 6 data indicates that passing wood chips in random array through the cutting head produces grain disruptions such as tend to enhance diffusion and heat transfer in many biomass conversion processes. The net effect of shearing each chip or particle once per pass, in random orientation at one or more cutter edges is to produce a feedstock with a preponderance of obliquely sheared, disrupted ends.

Thus, the subject wood particle mixtures are generally characterized by a disrupted grain structure as determined by the following protocol: drying 1000 g of a wood particle mixture to constant weight at 110° F.; selecting at random 100 of the dried wood particles for observation; observed each cross-grain end of each selected particle to categorize each cross-grain end as either smoothly cut substantially parallel to grain or obliquely sheared with disrupted fiber ends; and determining that the wood particles are characterized by a disrupted grain structure if at least a majority of the observed cross-grain ends are obliquely sheared with end checking Following additional passes through the cutter head, a substantial majority of the W×H surfaces in the mixture of wood particles will exhibit end checking conducive to heat transfer and diffusion.

A Retained Field Moisture Content Above the Fiber Saturation Point

In order to avoid biomass recalcitrance during conversion processing, a biomass feedstock should retain its field moisture content. As noted, the term "field moisture content" refers to wood chips and to comminuted feedstocks produced therefrom that retain a harvested moisture content above the approximately 30% fiber saturation point below which the physical and mechanical properties of wood begin to change as a function of moisture content. Such a wood materials has not been dried below its fiber saturation point and then rehydrated, e.g., by soaking in water.

Thus, the subject wood particle feedstocks are readily produced with a retained field moisture content greater than 30% dry weight basis, as determinable for example by the following protocol.

Moisture Content Determination Protocol

Definitions:
Fine Material—Material where the largest 10% of the mass appears visually to be less than 10 mm (0.4 inches) in length.
Coarse Material—Material where the largest 10% of the mass appears visually to be less than 200 mm (8 inches) in length.
Large Material—Material where the largest 10% of the mass appears visually to be greater than 200 mm (8 inches) in length.
Drying Container:
Use an oven safe container rated to at least 121° C. (250° F.). Ensure that the container prevents cross sample contamination and is labeled with the sample identification number. Appropriate containers may be a colander lined with a large coffee filter, small coffee filters placed in a muffin pan, or an edged baking sheet. Multiple samples may be placed on a tray for ease of handling, provided that each sample is independently contained, labeled, and removable for weighing.
Procedure:
1. Preheat oven to 105° C. (221° F.).
2. Determine the tare weight of the container including the liner, if used, without material in the container.
   a. Weigh the container (and liner).
   b. Record the container (and liner) weight to the nearest 0.1 grams, as the "Tare Weight."
3. Place the sample material into the container.
4. Weigh and record the combined weight of the material and container (and liner if used), as the "Gross Wet Weight."
5. Place container into the oven and dry for the appropriate time listed below in the Initial Drying Time section.
6. At the initial drying time weigh and record the mass of the sample (including container, liner, and material), as "Gross Weight TH" where T is the initial drying time in hours.
7. Return the material to the oven for a minimum of one additional hour.
8. After the additional time period weigh and record mass of the sample (including container, liner, and material), as "Gross Weight TH" where T is the time in hours since sample started drying (do not subtract the time out of the oven for weighing). Return the sample to the oven and calculate the moisture content as described below in the Moisture Content Calculation section.
   a. If the change in moisture content is 1% or less, the sample is dry. Record the combined weight of the material, container, and liner as "Gross Dry Weight. Record the moisture content as "Moisture Content Final. Remove the sample from the oven and store as appropriate.
   b. If the change in moisture content is greater than 1%, repeat steps 7-8 and record the moisture content as "Moisture Content TH" where T is the time in hours since sample started drying.
Initial Drying Time:
Fine Material—Material where the largest 10% of the mass appears visually to be less than 10 mm (½ inch) in thickness shall have an initial drying time of 4 hours.
Coarse Material—Material where the largest 10% of the mass appears visually to be greater than 10 mm (½ inch) in thickness shall have an initial drying time of 24 hours.
Filtrate Material—Material that is removed from a slurry shall have an initial drying time of 8 hours.
Moisture Content Calculation:
1. Calculate the Net Wet Weight by subtracting the Tare Weight from the Gross Wet Weight.
2. Calculate the Net Dry Weight by subtracting the Tare Weight from the last Gross Weight recorded.
3. Calculate the moisture content using the equation below.

$$MC_{wwb}=[(W_{wet}-W_{dry})/W_{wet}]\times 100$$

where:
$MC_{wwb}$=Moisture Content Wet Basis (i.e., % wwb)
$W_{wet}$=Net Wet Weight
$W_{dry}$=Net dry weight Low Energy Comminution Specific energy consumption for reprocessing whole-tree chips through a rotary shear appears to consume less than half the energy that would be required by a knife mill, grinder, hammer mill, or other attrition mill device. Data are shown in our provisional patent application No. 61/663,367, which is incorporated herein by reference in its entirety. As noted, in an operational setting, multipass shearing can be directly coupled where output from a first processing head (1-pass) feeds directly into a second processing head (2-pass) equipped with smaller cutter widths than the first.

Example 2

Corn Stover

Figure 7:
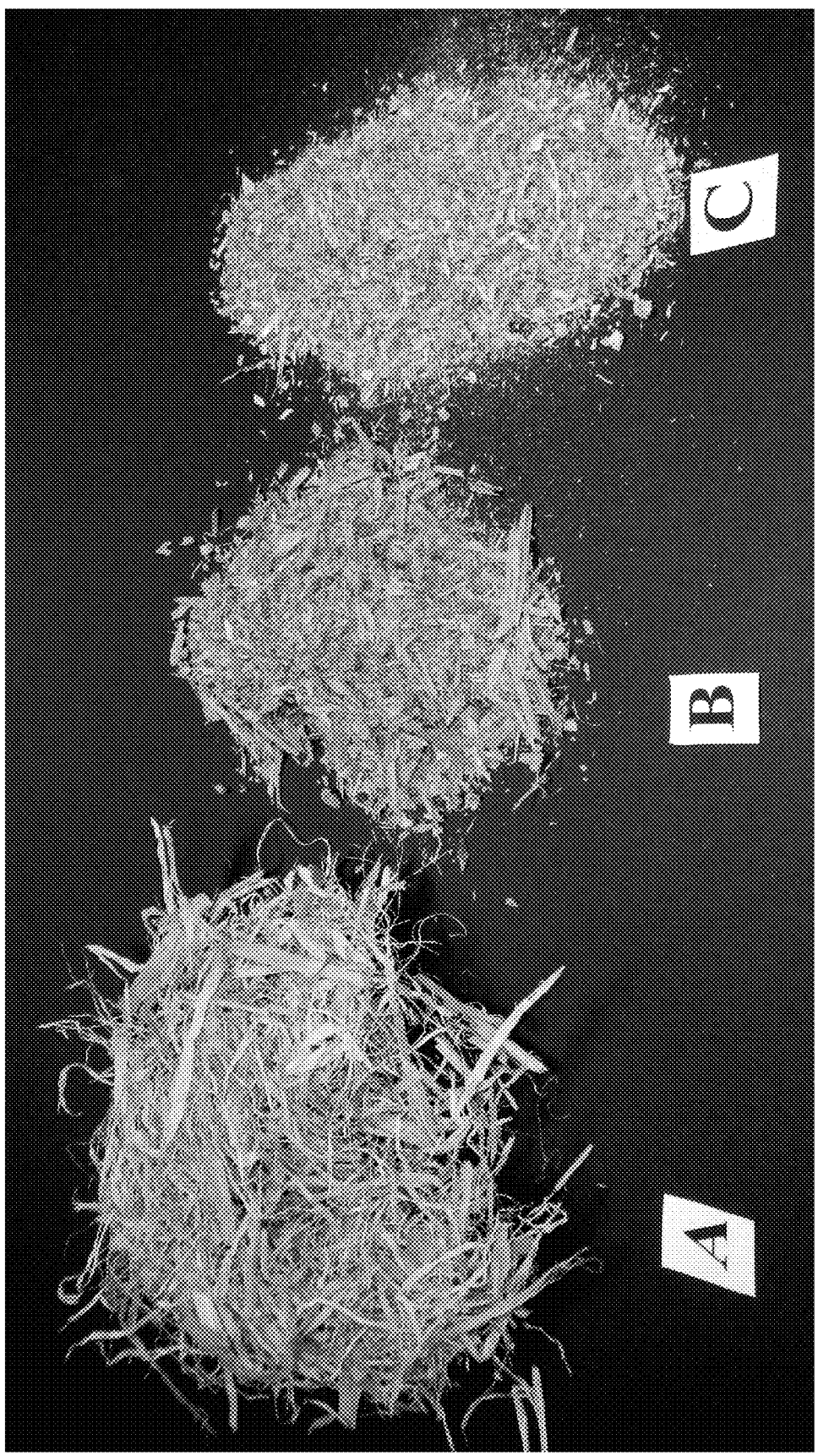
FIG. 7 is a photograph of 50-gram portions of three comminuted corn stover subsamples: A, de-baled and shredded (prior art); B, one-pass corn stover particles; and C, two-pass corn stover particles.

Materials and Methods
Idaho National Laboratory shipped us a supersack containing approximately 100 kg of pre-processed corn stover. INL reported that bales of corn stover had been pre-processed through their Vermeer® BG480E bale shredder using a 6-inch grate and then through their Bliss® hammermill with the grates removed in order to get the material to their sack filler. That material was loaded into supersacks without any subsequent processing or screening. FIG. 7A shows a representative sample of the as-received material, having approximately 12% MC (wwb) at the time of testing in our lab. The raw material was classified by particle size using two methods. Small duplicate samples were sieved using our "medium" standard sieve stack on our Gilson® tapping sieve shaker, Sieve Screen Model No. SS-12R. Size distribution profiles were characterized by shaking ~500 or 1000 g of each subsample for 5 minutes in a stacked assembly of 3 inch, 1½ inch, ½ inch, ¼ inch, No. 8, No. 16, and Pan screens (Forest Concepts 2013). Mass collected on each screen and moisture content were measured. A second larger sample was screened through our pilot plant two-deck orbital screen. The top screen was set to ¼ inch (6.4 mm) and the second screen was set to 20 mesh (0.84 mm). This resulted in three sorts—the material passing across the ¼ inch screen, the material passing that screen but retained on the 20 mesh screen, and the fines passing through the 20 mesh screen.

Additional INL raw material was processed through our Crumbler® M24 pilot plant rotary shear for either one or two passes without screening between passes. (The "M24" looks like the prototype shown in FIG. 2 but has a 24-inch wide processing head.) The cutter set in the Crumbler® M24 was 3/16 inch wide (4.8 mm). The output of each treatment was subsequently classified with the Gilson® tapping sieve shaker for 5 minutes using our "medium" standard sieve stack.

A further subsample of the INL raw material was subjected to a sequence of screening steps using our pilot plant two-deck orbital screen. The top screen was set to ¼ inch (6.4 mm) and the second screen was set to 20 mesh (0.84 mm). This resulted in three sorts—the material passing across the ¼ inch screen, the material passing that screen but retained on the 20 mesh screen, and the fines passing through the 20 mesh screen.

The raw material was first screened and the three fractions weighed.

The fraction retained on the ¼ inch screen was then recycled through the Crumbler® M24 and screened additional times, resulting in virtually all of the material having been processed to a size that passed through the ¼ inch screen.

This method of screening and recirculating the larger fraction back through the Crumbler® machine mimics the most likely method to be deployed in a commercial facility.

Select samples were classified for size analysis and ash content following established protocols.

Results and Discussion

The raw shredded corn stover (FIG. 7A) from Idaho National Lab included a fluffy fraction that appeared to be mostly leaf material, shardy and stick-like pieces of stalk, chunky pieces from the nodes, and a significant amount of fines, including dust that billowed during handling. The material had a moisture content of 12-13% wb, which was approximately the equilibrium moisture for our facility.

Figure 8:
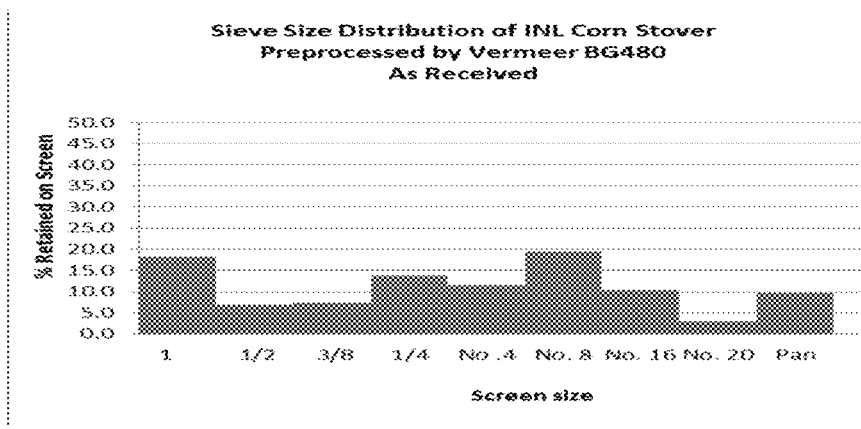
FIG. 8 shows particle size distribution for the shredded and milled corn stover starting material.

FIG. 8 shows the particle size distribution for the raw shredded corn stover received from INL. Geometric mean sieve was 8.8 mm (sd=5.0 mm).

Figure 9:
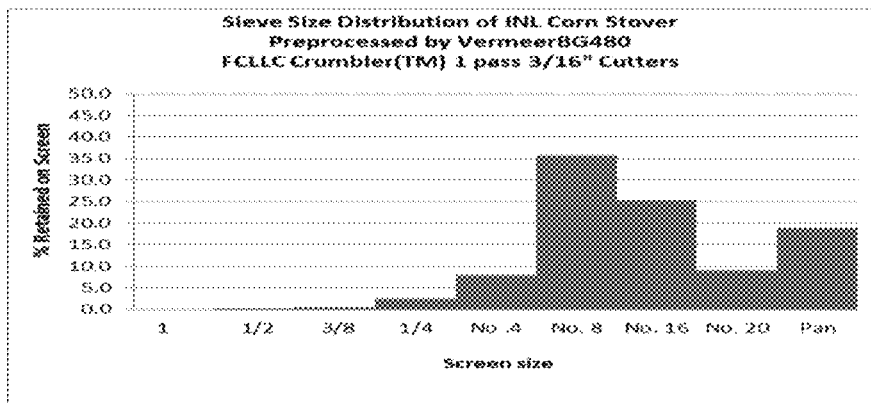
FIG. 9 shows particle size distribution for the corn stover starting material after one-pass through our Crumbler® M24 machine with 3/16 inch (4.8 mm) cutters; and, FIG. 10 shows particle size distribution for the corn stover starting material after two passes through our Crumbler® M24 machine with 3/16 inch (4.8 mm) cutters.

A sub-sample of the raw material was processed one-pass through our Crumbler® M24 machine with 3/16 inch (4.8 mm) cutters. Particle size distribution results are shown in FIG. 9. Geometric mean sieve was 2.4 mm (sd=2.7 mm). After a single pass through our Crumbler® M24 machine with 3/16 inch (4.8 mm) cutters, more than 97% of the mass passed through the ¼ inch (6.4 mm) screen. It is readily apparent that the rotary shear cut all of the long fluffy pieces into shorter particles. There was an increase in fines collected in the pan, most likely due to shattering of the very dry material.

Figure 10:
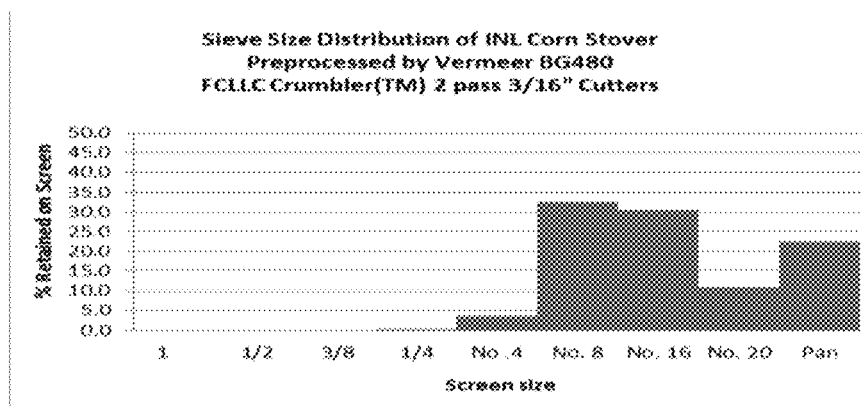

FIG. 10 shows size distribution results after two-passes through our Crumbler® M24 machine with 3/16 inch (4.8 mm) cutters. Geometric mean sieve was 2.0 mm (sd=2.6 mm). Half of the material from the one-pass test was recycled through the Crumbler® M24 machine with 3/16 inch (4.8 mm) cutters for a second pass. The results show a minor shift of particle sizes to smaller fractions, with more than 99% passing the ¼ inch sieve. Particle size analysis demonstrates that the corn stover particle size distribution converged on the 4.8 mm cutter width as expected. By observation, the length of larger particles was shorter in the two-pass material than observed in the one-pass material, also as expected.

Operational Crumbling and Sieving with Forest Concepts' Screen System 2448

A significant subsample of the INL material was processed through our Crumbler® M24 machine with 3/16 inch (4.8 mm) cutters for one pass and then immediately screened with our Screen System 2448 having ¼ inch mesh (6.4 mm) top screen and No. 20 mesh (0.8 mm) lower screen. The material retained on the top screen was then reprocessed through the Crumbler® machine, while the material retained on the lower screen and the fines passing through the 20 mesh screen were separately collected. This operation mimics a production facility where only the "overs" fractions are reprocessed.

Table 7 shows the results. An immediate observation was that much more material was retained on the ¼ inch screen than was predicted from tapping sieve shaker analysis results. The effect is most likely due to our pure orbital motion of the 2448 screen system that tends to sort material by length better than the Gilson® tapping sieve shaker. In addition, in a tapping sieve shaker stack there is a high tendency for shardy (high aspect ratio) material to tip and spear down through a series of sieves.

TABLE 7

Mass fractions for the raw INL corn stover material screened with our Screen System 2448 having ¼ inch mesh (6.4 mm) top screen and No. 20 mesh (0.8 mm) lower screen.

| | Sample 1 | | Sample 2 | |
| --- | --- | --- | --- | --- |
| | Mass (g) | Percentage (%) | Mass (g) | Percentage (%) |
| Retained on ¼ inch screen | 1420 | 50 | 1490 | 51 |
| Retained on 20 mesh screen | 962 | 34 | 984 | 34 |
| Fines passing 20 mesh screen | 436 | 15 | 436 | 15 |
| Total | 2818 | 99 | 2910 | 100 |

The results of screening two samples from the raw INL shredded corn stover show that half of the material already is sufficiently ground to pass through a ¼ inch mesh screen. Of the material that passed the ¼ inch screen, nearly one-third was fine enough to pass the No. 20 screen. We will report later on the ash content of each fraction.

From the data in Table 7, it is readily apparent that the productivity of our Crumbler® comminution equipment can be significantly increased if the INL shredded corn stover is first screened before feeding into the Crumbler® equipment.

Table 8 below documents an experiment where the INL material was first screened, and then the material retained on the ¼ inch screen was comminuted using our Crumbler® M24 with 3/16-inch (4.8 mm) wide cutters. The output was rescreened and the remaining "overs" retained on the ¼ inch screen were re-crumbled. The screen and comminute operation was repeated until a negligible amount was retained on top of the ¼ inch screen.

TABLE 8

Mass fractions for sorted raw stover and subsequent processing where material retained on the ¼" screen was ran through the Crumbler® M24 with 3/16 inch (4.8 mm) cutters for one pass and then immediately screened with our Screen System 2448 having ¼ inch mesh (6.4 mm) top screen and No. 20 mesh (0.8 mm) lower screen. Repeated until a negligible amount remained on the top screen.

| | Raw INL Corn Stover | | Reprocessed Overs | | Final Material | |
|---|---|---|---|---|---|---|
| | Mass (g) (od) | Percentage (%) | Mass (g) (od) | Percentage (%) | Mass (g) (od) | Percentage (%) |
| Retained on ¼ inch screen | 1514 | 42 | 20 | 1 | 20 | 1 |
| Retained on 20 mesh screen | 1607 | 45 | 1409 | 93 | 3016 | 84 |
| Fines passing 20 mesh screen | 459 | 13 | 74 | 5 | 533 | 15 |
| Lost from system | 0 | 0 | 11 | 1 | 11 | 0 |
| Total | 3580 | 100 | 1514 | 100 | 3580 | 100 |

It can be observed in the Table 8 data set that the raw material sample included more mid-sized particles than the samples reported in Table 7, but probably not significantly different. After sequential comminution and screening, the final material from the system had 84 percent yield of material that passed ¼-inch and was retained on the 20 mesh screen, and 15 percent fines. During reprocessing and handling, approximately one percent of the material was lost to dust and floor sweepings.

An important observation from this multi-pass recycling of the "overs" fraction is that very little additional fines were generated by the Crumbler™ M24 with 3/16-inch (4.8 mm) cutters.

Ash Reduction by Sieving with Two-Deck Screen System

Our opening hypothesis was that screening of raw shredded corn stover from bales would substantially reduce the amount of environmental ash in the material delivered to a subsequent fine comminution device. Reducing the environmental ash ahead of fine comminution would reduce wear and maintenance costs for hammermills, crumblers, or other comminution equipment. It was further assumed that bale shredding with coarse equipment such as the Vermeer BG480E machine would liberate most of the environmental ash that had been entrained in the bales during harvest.

We know that clean corn stover has a biogenic ash content of approximately four percent. Thus, we can subtract 4% from our ash measurements to approximate the amount of environmental ash in a sample.

We assessed the ash content of different sort fractions of INL corn stover sorted by our Screen System 2448. First, we compared the ash content of stover as received with material retained on the ¼ inch screen and subsequently run through the Crumbler® M24 with 3/16-inch (4.8 mm) cutters. Both these materials were run through the 2448 screens, and material retained on the 20 mesh screen and fines passing the 20 mesh screen were separately tested for ash content. We also conducted an ash reduction assessment of all three 2448 screen sorts of the material as received. Tables 9 and 10 present results.

TABLE 9

Ash content of corn stover biomass sorted through the Screen System 2448 having ¼ inch mesh (6.4 mm) top screen and No. 20 mesh (0.8 mm) lower screen.
Raw INL Stover

| | Ash Content Percentage | | | | | |
|---|---|---|---|---|---|---|
| | Rep 1 | Rep 2 | Rep 3 | Rep 4 | Total Average | Average Appoximate Environmental Ash |
| retained on ¼" screen | 4.70% | 5.55% | | | 5.13% | 1.13% |
| retained on 20 mesh screen | 7.17% | 8.17% | 6.93% | 6.45% | 7.18% | 3.18% |
| fines passing 20 mesh screen | 32.76% | 34.85% | 31.15% | 27.82% | 31.64% | 27.64% |

The screening of raw shredded corn stover results in dramatically different ash content depending on the relative screen size. Fines passing through the 20 mesh screen had an average environmental ash content of 27.64% after adjusting for approximate biogenic ash content. In comparison to this, material retained on the 20 mesh screen had a an average and approximate environmental ash content of 3.18%, and material retained on the top ¼" screen had an adjusted ash content of 1.13%.

TABLE 10

Ash content of screen fractions for corn stover biomass whereby material retained on the ¼" screen was ran through the Crumbler® M24 with 3/16 inch (4.8 mm) cutters for one pass and then immediately screened with our Screen System 2448 having ¼ inch mesh (6.4 mm) top screen and No. 20 mesh (0.8 mm) lower screen. Repeated until a negligible amount remained on the top screen.
Reprocessed Overs

| | Ash Content Percentage | | | |
|---|---|---|---|---|
| | Rep 1 | Rep 2 | Total Average | Average Approximate Environmental Ash |
| retained on ¼" screen | | | | |
| retained on 20 mesh screen | 4.02% | 4.24% | 4.13% | 0.13% |
| fines passing 20 mesh screen | 8.66% | 7.26% | 7.96% | 3.96% |

Screening of material processed through the Crumbler® M24 displayed a lower overall ash content. As Table 8 indicates, the average environmental ash content of raw corn stover material retained on the ¼ inch screen was 1.13%. After further processing, the majority of the material remaining, the "mid" length particles retained on the 20 mesh screen, had an average approximate environmental ash content of 0.13%. Further, the fines passing through indicated far lower ash content, 3.96%, as compared to the raw fines, 27.64%. The screening out of fines appears to be highly beneficial in the reduction of ash content overall.

While the preferred embodiment of the invention has been illustrated and described, it will be appreciated that various changes can be made therein without departing from the spirit and scope of the invention.

We claim:

1. A corn stover particle feedstock characterized by a substantially uniform size distribution profile as determined by the following protocol:
   drying approximately 1000 g of the corn stover particle feedstock to constant weight at 110° F.;
   pouring 400 g of the dried corn stover particles into a stacked screen assembly consisting of in a contiguous size-ordered array:
      a top ⅜-inch screen having 9.53 mm nominal sieve openings,
      a No. 4 screen having 4.75 mm nominal sieve openings,
      a No. 10 screen having 2.00 mm nominal sieve openings,
      a No. 16 screen having 1.18 mm nominal sieve openings,
      a No. 20 screen having 0.84 mm nominal sieve openings,
      a No. 35 screen having 0.50 mm nominal sieve openings,
      a No. 50 screen having 0.30 mm nominal sieve openings,
      a No. 100 screen having 0.15 mm nominal sieve openings, and a bottom pan;
   shaking the stacked screen assembly for 10 minutes on a motorized tapping sieve shaker;
   weighing corn stover particles retained on each of the screens; and
   determining that the corn stover particle feedstock is characterized by a substantially uniform size distribution profile if the sum of the weights of corn stover particles retained on any contiguous five of the screens exceeds 320 g in total.

2. The corn stover particle feedstock of claim 1, further characterized by having a retained field moisture content of at least 30% dry weight.

3. The corn stover particle feedstock of claim 1, wherein the sum of the weights of corn stover particles retained on any contiguous three of the screens exceeds 360 g in total.

4. The corn stover particle feedstock of claim 1, wherein the motorized tapping sieve shaker is a Gilson® tapping sieve shaker.

5. The corn stover particle feedstock of claim 4, wherein the Gilson® tapping sieve shaker is a Sieve Screen Model No. SS-12R.

6. A corn stover particle feedstock characterized by a substantially uniform size distribution profile as determined by the following protocol:
   drying approximately 1000 g of the corn stover particle feedstock to constant weight at 110° F.;
   pouring 400 g of the dried corn stover particles into a stacked screen assembly consisting of in a contiguous size-ordered array:
      a top 1-inch screen having 25.00 mm nominal sieve openings,
      a ½-inch screen having 12.50 mm nominal sieve openings,
      a ⅜-inch screen having 9.53 mm nominal sieve openings,
      a ¼-inch screen having 6.30 mm nominal sieve openings,
      a No. 4 screen having 4.75 mm nominal sieve openings,
      a No. 8 screen having 2.38 mm nominal sieve openings,
      a No. 16 screen having 1.18 mm nominal sieve openings,
      a No. 20 screen having 0.84 mm nominal sieve openings, and
      a bottom pan;
   shaking the stacked screen assembly for 10 minutes on a motorized tapping sieve shaker;
   weighing corn stover particles retained on each of the screens; and
   determining that the corn stover particle feedstock is characterized by a substantially uniform size distribution profile if the sum of the weights of corn stover particles retained on any contiguous five of the screens exceeds 320 g in total.

7. The corn stover particle feedstock of claim 6, further characterized by having a retained field moisture content of at least 30% dry weight.

8. The corn stover particle feedstock of claim 6, wherein the sum of the weights of corn stover particles retained on any contiguous three of the screens exceeds 360 g in total.

9. The corn stover particle feedstock of claim 6, wherein the motorized tapping sieve shaker is a Gilson® tapping sieve shaker.

10. The corn stover particle feedstock of claim 9, wherein the Gilson® tapping sieve shaker is a Sieve Screen Model No. SS-12R.

11. A corn stover particle feedstock characterized by a substantially uniform size distribution profile as determined by the following protocol:
   drying approximately 1000 g of the corn stover particle feedstock to constant weight at 110° F.;
   pouring 400 g of the dried corn stover particles into a stacked screen assembly consisting of in a contiguous size-ordered array:
      a top 3-inch screen having 75.00 mm nominal sieve openings,
      a 1.5-inch screen having 37.50 mm nominal sieve openings,
      a 1-inch screen having 25.00 mm nominal sieve openings,
      a ½-inch screen having 12.50 mm nominal sieve openings,
      a ¼-inch screen having 6.30 mm nominal sieve openings,
      a ⅛-inch screen having 3.18 mm nominal sieve openings,
      a No. 16 screen having 1.18 mm nominal sieve openings, and
      a bottom pan;
   shaking the stacked screen assembly for 10 minutes on a motorized tapping sieve shaker;
   weighing corn stover particles retained on each of the screens; and
   determining that the corn stover particle feedstock is characterized by a substantially uniform size distribution profile if the sum of the weights of corn stover particles retained on any contiguous five of the screens exceeds 320 g in total.

12. The corn stover particle feedstock of claim 11, further characterized by having a retained field moisture content of at least 30% dry weight.

13. The corn stover particle feedstock of claim 11, wherein the sum of the weights of corn stover particles retained on any contiguous three of the screens exceeds 360 g in total.

14. The corn stover particle feedstock of claim 11, wherein the motorized tapping sieve shaker is a Gilson® tapping sieve shaker.

15. The corn stover particle feedstock of claim 14, wherein the Gilson® tapping sieve shaker is a Sieve Screen Model No. SS-12R.

* * * * *